(12) United States Patent
Lacey et al.

(10) Patent No.: US 11,768,735 B2
(45) Date of Patent: *Sep. 26, 2023

(54) CHECKPOINTING

(71) Applicant: Graphcore Limited, Bristol (GB)

(72) Inventors: David Lacey, Cheltenham (GB); Daniel John Pelham Wilkinson, West Harptree (GB)

(73) Assignee: GRAPHCORE LIMITED, Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/651,012

(22) Filed: Feb. 14, 2022

(65) Prior Publication Data

US 2022/0164255 A1    May 26, 2022

Related U.S. Application Data

(63) Continuation-in-part of application No. 16/419,361, filed on May 22, 2019, now Pat. No. 11,263,081.

(30) Foreign Application Priority Data

Apr. 2, 2019 (GB) .................................. 1904628

(51) Int. Cl.
   *G06F 11/14* (2006.01)
   *G06F 9/52* (2006.01)
   *G06F 11/36* (2006.01)

(52) U.S. Cl.
   CPC .......... *G06F 11/1407* (2013.01); *G06F 9/522* (2013.01); *G06F 11/141* (2013.01); *G06F 11/3632* (2013.01); *G06F 11/3636* (2013.01)

(58) Field of Classification Search
   CPC .... G06F 11/1407; G06F 9/522; G06F 11/141; G06F 11/3632; G06F 11/3636
   (Continued)

(56) References Cited

U.S. PATENT DOCUMENTS

| 5,530,802 A | 6/1996 | Fuchs |
| 11,263,081 B2 * | 3/2022 | Lacey ................... G06F 9/3867 |
| 2014/0304545 A1 * | 10/2014 | Chen ................... G06F 11/1438 |
| | | 714/4.3 |

OTHER PUBLICATIONS

Search Report for United Kingdom Patent Application No. GB1904628.3 dated Sep. 27, 2019. 4 pages.
(Continued)

*Primary Examiner* — Yair Leibovich
(74) *Attorney, Agent, or Firm* — HAYNES AND BOONE LLP

(57) ABSTRACT

A system comprising: a first subsystem comprising at least one first processor, and a second subsystem comprising one or more second processors. A first program is arranged to run on the at least one first processor, the first program being configured to send data from the first subsystem to the second subsystem. A second program is arranged to run on the one more second processors, the second program being configured to operate on the data content from the first subsystem. The first program is configured to set a checkpoint at one or more points in time. At each checkpoint it records in memory of the first subsystem i) a program state of the second program, comprising a state of one or more registers on each of the second processors at the time of the checkpoint, and ii) a copy of the data content sent to the second subsystem since the respective checkpoint.

31 Claims, 4 Drawing Sheets

(58) Field of Classification Search
USPC .......................................................... 714/15
See application file for complete search history.

(56) References Cited

OTHER PUBLICATIONS

Chakravorty, "A Fault Tolerance Protocol with Fast Fault Recovery", 2007, IEEE, pp. 1-10. Department of Computer Science, University of Illinois at Urbana-Champaign.

\* cited by examiner

CHECKPOINTING

CROSS-REFERENCE TO RELATED APPLICATIONS

This application is a Continuation-in-Part of U.S. patent application Ser. No. 16/419,361, filed May 22, 2019, which claims the priority benefit under 35 U.S.C. § 119 of United Kingdom Patent Application No. 1904628.3, filed Apr. 2, 2019, the entire contents of which are incorporated herein by reference in their entireties.

TECHNICAL FIELD

The present disclosure relates to checkpointing of a program run on a processor, so as to enable recovery in event of an error or failure.

BACKGROUND

Nowadays computer systems are increasingly employing parallel and concurrent computing techniques. Concurrency refers to the case where multiple program threads are interleaved through a common execution pipeline. Parallelism refers to the case where multiple separate execution pipelines are provided in parallel. As such systems grow beyond simple single-processor, single-core devices, the implementation of error recovery, fault recovery and debugging becomes more complex.

A multi-threaded processor typically comprises a common instruction memory, data memory and execution pipeline; but to support the multi-threading, the processor also comprises a respective context register file for each of the number of threads that can be executed concurrently. The "context" refers to the program state of a respective one of the threads being executed concurrently (e.g. program counter value, control-state, and current operand values). The context register file refers to the respective collection of registers for representing this program state of the respective thread. Registers in a register file are distinct from general purpose memory in that register addresses are fixed as bits in instruction words, whereas memory addresses can be computed by executing instructions.

The registers of a given context typically comprise a respective program counter for the respective thread, and a respective set of operand registers for temporarily holding the data acted upon and output by the respective thread during the computations performed by that thread. They may also comprise, e.g., one or more control state registers for holding other, control-related state of the respective thread. The threads are executed in an interleaved manner through a common execution pipeline (or at least a common part of a pipeline), each executing in a respective time slot using its own respective context registers to represent its program state.

True parallelism (as opposed to concurrency) can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables the code run on the different tiles to communicate between tiles. In some cases the processing unit on each tile may itself run multiple concurrent threads on tile, each tile having its own respective set of contexts and corresponding pipeline as described above in order to support interleaving of multiple threads on the same tile through the same pipeline.

In general, there may exist dependencies between the portions of a program running on different tiles. A technique is therefore typically employed to prevent a piece of code on one tile running ahead of data upon which it is dependent being made available by another piece of code on another tile. There are a number of possible schemes for achieving this. For instance one particular scheme is known as "bulk synchronous parallel" (BSP). According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Further, according to the BSP principle, a barrier synchronization is placed at the juncture transitioning from the compute phase into the exchange phase, or transitioning from the exchange phase into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. In some scenarios a tile in the compute phase may be allowed to communicate with other system resources such as a network card or storage disk, as long as no communication with other tiles in the group is involved.

An example use of multi-threaded and/or multi-tiled processing is found in machine intelligence. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for concurrency and/or parallelism.

In any system there is a chance of error or failure. For instance cosmic radiation can cause bit flips in memory, and the chance of this can grow with the scale of the system. Even with error correction based on error correction codes (ECCs), statistically there will eventually still be some errors that are not correctable. In other examples a power supply failure could lead to a halt in the program and the current state being lost. To guard against such problems, it is known to save the program state and memory contents at intervals so that the program can be replayed from the start of the last interval in the event of error or failure. This is known as "checkpointing" (the point at which the state is saved being the "checkpoint"). In other words a snapshot is taken of the program and memory so that, if required, the program can be replayed from there instead of rebooted from scratch. This can also be useful for debugging as well as error or fault recovery in-the-field.

SUMMARY

However, an issue with checkpointing is that the behaviour of the program being replayed may depend not only on its inherent code and its state at the time of the checkpoint, but also on external stimulus received between the time of the last checkpoint and the point of the error or failure. If the same external data is not received when replaying the program, compared to the data originally received between the time of recording the checkpoint and the occurrence of the error or failure, then the behaviour of the program will not be identical when replayed.

According to one aspect disclosed herein there is provided a processing system comprising: a first subsystem comprising at least one first processor, and a second subsystem comprising one or more second processors. A first program is arranged to run on the at least one first processor, the first program being configured to send data from the first subsystem to the second subsystem. A second program is arranged to run on the one more second processors, the second program being configured to operate on said data content sent from the first subsystem. The first program is configured to set a respective checkpoint at each of one or more points in time, whereby at each checkpoint the first program records in a memory of the first subsystem: i) a respective program state of the second program, comprising at least a state of one or more registers on each of the second processors at the time of the respective checkpoint (the second program being configured to read its register state(s) and report it/them to the at least one first processor); and ii) a copy of the data content sent to the second subsystem in the time since the respective checkpoint. The first program is further configured so as, upon detection of a replay event, to re-send from the first subsystem to the second subsystem the data content recorded since a selected checkpoint or the last (most recent) checkpoint, and to control the second subsystem to replay at least part of the second program on at least one of second processors from the selected or most recent checkpoint, starting with the respective recorded program state and operating on the re-sent data content.

In embodiments the replay may be automatic upon detection of the replay event (e.g. an automated detection of a memory error or power failure). Alternatively the replay could be triggered manually by a developer.

In embodiments, the first program may be configured so as, upon detection of the replay event, to replay at least a corresponding part of the first program corresponding to the replayed second program. In embodiments the replayed part of the first program may perform said re-sending. Alternatively the re-sending could be performed by a separate event handling routine that is triggered when the replay event occurs.

In embodiments the first program may be configured to perform said sending and re-sending by sending said data content from said at least one first processor. In this case the first program can perform said recording of the data content by recording the data content already present at the at least one first processor ahead of the sending. This may comprise sending said data content from said at least one first processor divided into a plurality of units (e.g. bits, bytes, words, or packets, etc.), and performing said recording of the data content by recording each unit of the data content prior to the sending.

Alternatively, the first subsystem may further comprises one or more storage devices and/or gateway processors; and the first program may be configured to perform said sending by controlling at least one of the storage devices and/or gateway processors to send said data content to the second subsystem, and may be further configured to control the at least one storage device and/or gateway processor to send a copy of the data content to the first processor. In this case the first program may be arranged to perform said recording of the data content by recording the copy received from the one or more storage devices and/or gateways, and to perform said re-sending by sending from the first processor.

In embodiments each checkpoint may be placed after a respective synchronization point such as a barrier synchronization. In this case the replaying comprises replaying from the last synchronization point, e.g. the last barrier. Alternatively the checkpoints could be placed on another basis, such as at random intervals, in response to certain events, or at regular intervals in time In embodiments, the second program may be arranged to operate in a series of phases, wherein each phase comprises a respective one or more codelets; and the first program may be configured to set each checkpoint between the end of a respective one of the phases and the start of the next phase in the series.

A codelet is a portion of code which, after being launched, is not dependent on any data output by any other part of the same program (in this case the second program), and no other part of the program is dependent on any data output by the codelet until after the codelet has terminated. In other words it is an "atomic" piece of code. By placing the checkpoints at synchronization points between codelets, this means the replay always starts from a new codelet or codelets, and not part way through any codelet. Further, in embodiments each codelet does not assume any pre-existing state of any operand registers prior to being launched. This means that only a small amount of persistent state needs to be saved at each checkpoint, such as a PRNG state and/or arithmetic rounding mode.

In embodiments, the one or more second processors may comprise a plurality of second processors, and a respective part of the second program may be arranged to run on each of the second processors. In this case said replaying of the second program may comprise replaying at least the respective part of the second program arranged to run on the at least one second processor.

In embodiments the first program may be configured so as, upon detection of the replay event, to control the second subsystem to replay the second program across all of the second processors from the last checkpoint.

In embodiments, the first program may be configured so as, upon detection of the replay event, to control the second subsystem to replay only the respective part or parts of the second program on a selected subset of one or more of the second processors from the last checkpoint.

In embodiments, the respective part of the second program arranged to run on each second processor may comprise at least one respective codelet, and the second program may be arranged to operate in a series of phases with a barrier synchronization between at least some of the phases, the barrier preventing the second program advancing to the next phase until all the codelets in the current phase have completed across all the second processors. The first program may be configured to set each checkpoint between a respective one of the barriers and the next phase immediately following the respective barrier.

In embodiments, each second processor may comprise a plurality of tiles, each tile comprising a separate processing unit and memory, and each arranged to run a respective portion of the respective part of the second program.

In embodiments, the second program may be arranged to operate in a series of bulk synchronous parallel, BSP, supersteps, each superstep comprising an exchange phase and a compute phase following the exchange phase, wherein each superstep:
- in the compute phase the second processors perform only respective computations or internal exchanges between tiles but not exchanges between the second processors, and in the exchange phase the second processors exchange computation results between one another, wherein the compute phase is separated from the exchange phase of the next superstep by a barrier synchronization, whereby all the second processors must complete their respective computations of the compute phase before any of the second processors is allowed to proceed to the exchange phase of the next superstep, or
- on each second processor, in the compute phase the tiles on the second processor perform only respective computations but not exchanges between tiles, and in the exchange phase the tiles on the second processor exchange computation results between one another, wherein the compute phase is separated from the exchange phase of the next superstep by a barrier synchronization, whereby all the tiles on the same second processor must complete their respective computations of the compute phase before any of those tiles is allowed to proceed to the exchange phase of the next superstep;
wherein the first program is configured, in setting each checkpoint, to record which in the series of BSP supersteps the second program has reached at the time of the respective checkpoint; and
the first program is configured to set said each of the checkpoints between the barrier synchronization and the following compute phase in a respective one of the BSP supersteps, the replay comprising replaying from the start of the compute phase of the last recorded BSP superstep.

In embodiments each second processor may comprise a multi-threaded processing unit configured to execute multiple threads of the second program concurrently, each of the concurrent threads having a corresponding set of context registers arranged to hold a state of the thread. The recorded program state at each checkpoint may comprise the state of one, some or all of the threads on each second processor.

In embodiments each second processor may comprise multiple tiles, each tile comprising a processing unit and memory, wherein a respective part of the second program may be arranged to run on each of the tiles. Said replaying of the second program may comprise replaying at least the respective part of the second program arranged to run on the at least one of the tiles.

In embodiments the processing unit on each tile may comprise a multi-threaded processing unit.

In embodiments each of the second processors comprises memory for storing memory content, and the implementing of each checkpoint comprises recording some or all of the memory content of each second processor. Alternatively the second program may not be dependent on pre-existing memory content prior to the checkpoint, in which case it is not required to record the memory content.

In embodiments, the second subsystem may comprises an error detection mechanism configured to detect an error in the second subsystem; and said replay event may comprise an error, the detection of the replay event comprising detection of the error by the error detection mechanism.

In embodiments, each of the second processor comprises memory used by at least part of the second program, and the error detection mechanism may comprise a memory error detection mechanism for detecting errors in the memory of each second processor; wherein said replay event may comprise a memory error in a memory of one of the second processors, the detection of the error being by the error detection mechanism.

In embodiments, said error detection mechanism may comprise a parity check mechanism configured to detect said memory error based on a parity check of redundant parity bits included in the memory.

In embodiments, the memory of each of the one or more second processors may comprise no error correction mechanism for correcting errors in the memory based on redundant error correction codes included in the memory.

In alternative or additional embodiments, the second subsystem may comprises a power failure detection mechanism configured to detect a failure in a power supply of the second subsystem, and the replay event comprises a failure of the power supply, the detection of the failure being by the power failure detection mechanism.

In further alternative or additional examples, the replay event may comprise a manual intervention by a developer testing or debugging the second program.

As an example of the checkpointed program state, in embodiments each of the second processors may comprise a pseudo random number generator, PRNG, arranged to generate a pseudo random number seeded by a seed value in a PRNG register of the second processor, wherein the recorded program state may comprise the seed value in the PRNG seed register on each second processor.

Alternatively or additionally, each of the second processors may be configured to apply a rounding mode specified by a rounding mode value held in a rounding mode register of the second processor, wherein the recorded program state may comprise the rounding mode value in a rounding mode register on each second processor.

In some embodiments the recorded state may comprise the program counter value. Alternatively the point reached in the program may be recorded in other ways, e.g. the number of phases or BSP supersteps. In some embodiments the recorded state may comprise the state of one or more operand registers. Alternatively, each checkpoint may be placed at the start of a respective phase of the second program that does not assume any pre-existing state of the operand registers. For instance each codelet may only be dependent on its inherent code, a small amount of persistent state (e.g. PRNG seed and/or rounding mode), the external data received from the first/host subsystem, and in embodiments also the state of a predetermined area of memory assigned to be read by the codelet. If instead a codelet is dependent on data received from another part of the second program or elsewhere prior to the codelet being launched, this will need to be captured at the checkpoint.

In embodiments, the first subsystem may be a host subsystem and the at least one first processor may be a host CPU; and the second subsystem may be an accelerator subsystem, the one or more second processors being one or more accelerator processors arranged to perform work allocated by the host CPU.

In an example application, the second program may comprise a neural network and said data content may comprise experience data, the neural network being arranged to learn based on said experience data.

According to another aspect disclosed herein, there is provided a method of operating a first subsystem comprising at least one first processor; the method comprising, by running a first program on the first subsystem: sending data from the first subsystem to a second subsystem comprising one or more second processors, wherein a second program is arranged to run on the one more second processors, the second program being configured to operate on said data content sent from the first subsystem; operating the first subsystem to set a respective checkpoint at each of one or more points in time, by, at each checkpoint, recording in a memory of the first subsystem i) a respective program state of the second program, comprising at least a state of one or more registers on each of the second processors at the time of the respective checkpoint, and ii) a copy of the data content sent to the second subsystem in the time since the respective checkpoint; and upon detection of a replay event, re-sending from the first subsystem to the second subsystem the data content recorded since a selected checkpoint or the most recent checkpoint, and controlling the second subsystem to replay at least part of the second program on at least one of second processors from a selected or the most recent checkpoint, starting with the respective recorded program state and operating on the re-sent data content.

In embodiments the method may further comprise steps in accordance with any of the system features disclosed herein.

According to another aspect disclosed herein there is provided a first program comprising code embodied on computer-readable storage and configured so as when run on a first subsystem comprising at least one processor to perform operations of: sending data from the first subsystem to a second program run on a second subsystem comprising one or more second processors, the second program being configured to operate on said data content sent from the first subsystem; operating the first subsystem to set a respective checkpoint at each of one or more points in time, by, at each checkpoint, recording in a memory of the first subsystem i) a respective program state of the second program, comprising at least a state of one or more registers on each of the second processors at the time of the respective checkpoint, and ii) a copy of the data content sent to the second subsystem in the time since the respective checkpoint; and upon detection of a replay event, re-sending from the first subsystem to the second subsystem the data content recorded since a selected checkpoint or the most recent checkpoint, and to control the second subsystem to replay at least part of the second program on at least one of second processors from the selected or most recent checkpoint, starting with the respective recorded program state and operating on the re-sent data content.

In embodiments the first and/or second program may be further configured to perform operations in accordance with any of the features disclosed herein.

BRIEF DESCRIPTION OF THE DRAWINGS

To aid understanding of the present disclosure and to show how embodiments may be put into effect, reference is made by way of example to the accompanying drawings in which.

DETAILED DESCRIPTION OF EMBODIMENTS

Figure 1:
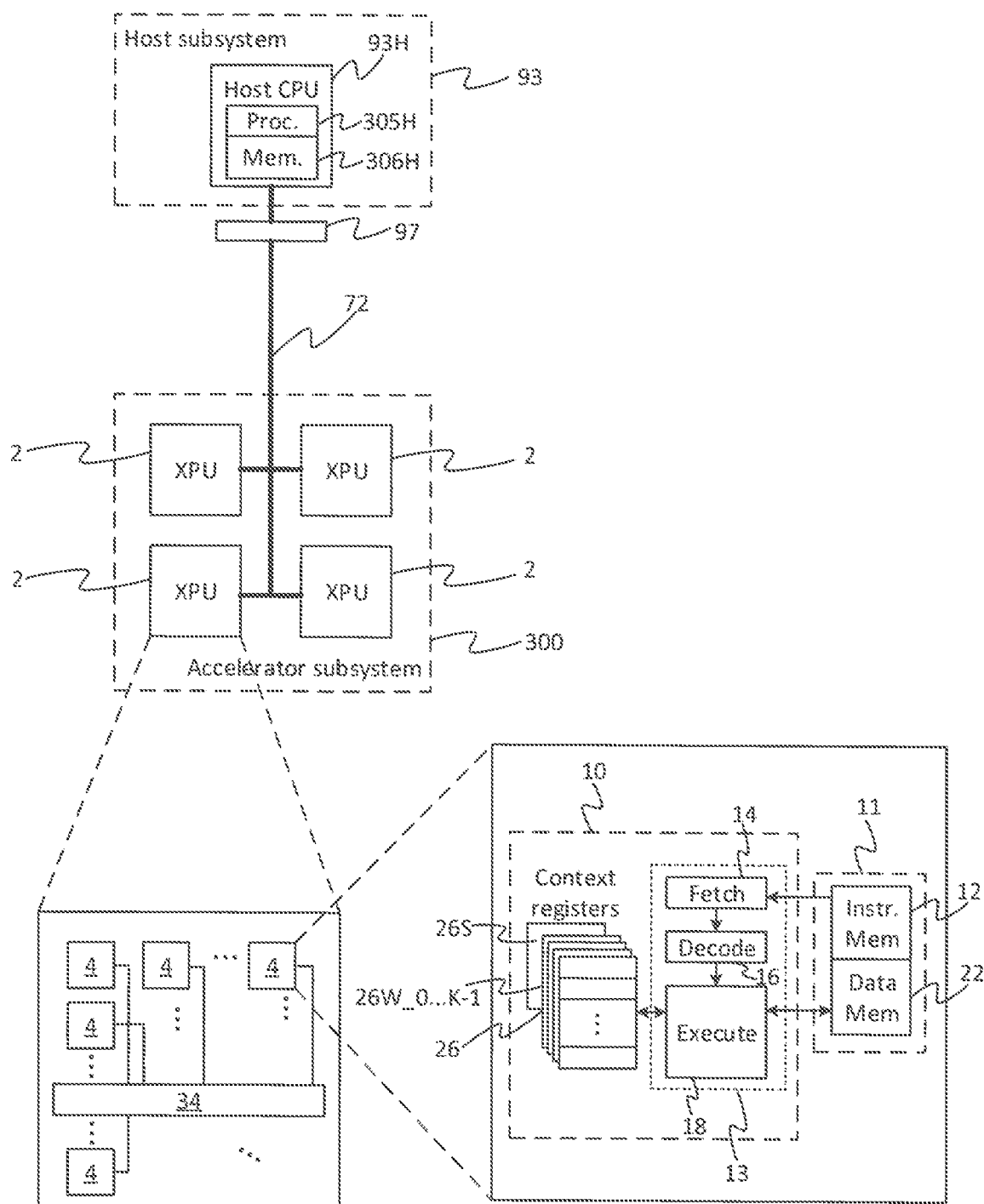
FIG. 1 is a schematic block diagram of a host subsystem and accelerator subsystem.

FIG. 1 shows an example system in accordance with embodiments of the present disclosure. The system comprises a first processing subsystem 93 comprising at least one first processor, and a second processing subsystem 300 comprising one or more second processors 2. The first subsystem 93 may be a host subsystem and the second subsystem may be an accelerator subsystem. That is, the at least one first processor may be a host processor (host CPU) 93H configured with the role of a host, for allocating work (i.e. tasks in the form of processing); and each of the one or more second processors 2 may be an accelerator processor ("XPU"), i.e. a co-processor which is arranged to perform work allocated by the host processor 93H. The host processor 93H is privileged and the accelerator devices 2 undertake work delegated by the host processor 93H. In embodiments each of the accelerator processors 2 may take the form of an IPU ("Intelligence Processing Unit") designed specially for use as a machine intelligence accelerator processor.

Embodiments below will be described in terms of the first subsystem 93 taking the role of a host subsystem and the second subsystem 300 taking the role of an accelerator subsystem.

Embodiments will also be described in terms of the accelerator subsystem 300 comprising a plurality of second processors 2. However it will be appreciated that such features are not necessarily limiting, and more generally the teachings below can apply to any arrangement of a first subsystem 93 comprising one or more first processors (e.g. 93H) and a second subsystem 300 comprising one or more second processors 2.

The multiple accelerator processors 2 are connected together by an inter-processor interconnect 72. For instance each of the processors 2 may be implemented on a separate chip (die) and the inter-processor interconnect 72 may take the form of an external interconnect, i.e. inter-chip interface. The chips could be packaged on the same integrated circuit (IC) package, or different packages, or some on the same package and some on different packages. The inter-processor interconnect 72 also connects the accelerator processors 2 to the host processor 93H via a suitable host interface 97 such as a PCI, PCIe or Ethernet interface. The inter-processor interconnect 72 comprises a network of data paths for exchanging data between accelerator processors 2 and/or between accelerator 2 and host processor 93H.

In embodiments the inter-processor interconnect 72 is a non-time-deterministic interconnect, in that the transmission of data over the data paths of this interconnect 72 is non-time-deterministic in nature. I.e. the timing cannot be known or at least not guaranteed, e.g. because delivery is not guaranteed and therefore may require retransmission.

The host processor 93H comprises a respective processing unit 305H and memory 306H. Each of the accelerator processors 2 also comprises at least one respective processing unit and memory. In embodiments, each of one, some or all of the accelerator processors 2 may comprise a respective array of tiles 4. In embodiments the tiles 4 of a given processor 2 are implemented on the same chip (die) as one another. Each tile 4 comprises a respective processing unit 10 and memory 11. The tiles 4 are connected together via an internal, inter-tile interconnect 34 which enables transfer of data between tiles 4. In embodiments the inter-tile interconnect 34 may be a time-deterministic interconnect, enabling time-deterministic exchange of data between tiles 4. The internal interconnect 34 may also enable synchronization between tiles 4.

The first subsystem 93 is arranged to run a first program, which may be referred to as the host program or control program. It is stored on the host memory 305H and arranged to run on the processing unit(s) 305H of the (at least one) host processor 93H.

The respective memory 11 on each tile 4 comprises a respective program memory (instruction memory) 12 and data memory 22. These may be implemented as distinct memory devices or simply different regions in the same one or more memory devices (these regions not necessarily limited to being specially segregated). The program memory 12 on each tile 4 stores a different respective part of a second program to be run on the second subsystem 300, the part on each tile 4 being arranged to run on the respective processing unit 10 of that tile.

The first program is configured so as, when run on the at least one processor 93H of the first subsystem 93, to send data content to the second subsystem 300 via the interface 97 and external interconnect 72, to be processed by the second program running on the second subsystem 300. In an exemplary application of the disclosed system, the second program may comprise a machine learning algorithm and the data sent to the second subsystem 300 comprises experience data (e.g. training data). The machine learning algorithm may be configured so as when run on the second subsystem 300 to learn based on the received experience data, i.e. to adapt the weights of at least some of its nodes weights. Techniques for learning in this manner are known in the art, e.g. based on stochastic back propagation. The experience data sent from the first subsystem 93 may for example comprise images, sounds, text, survey data, online shopping data, etc. Based on this, the neural network may be trained to identify, e.g., objects, faces, sounds, user behaviour, or other structures in the received experience data.

The respective processing unit 10 on each tile 4 comprises a respective pipeline 13, comprising a fetch stage 14, decode stage 16 and execution stage (execution unit) 18. The processing unit 10 on each tile 4 further comprises one or more registers 26 representing a program state of the part of the second program running on the respective tile 4. These include at least a program counter (PC) and a set of operand registers for holding operand values operated upon and output by the instructions executed by the execution unit 18. The registers 26 typically also include one or more control state register (CSRs).

The fetch stage 14 is arranged to fetch each instruction to be executed from a point in the instruction memory 12 specified by the current PC value, and to pass these instructions through the rest of the pipeline 13. Each instruction comprises an opcode and zero or more operand fields, which may contain immediate operand values or pointers to an operand values in the operand registers. The instructions are decoded by the decode stage 16 and then passed to the execution unit 18 to execute the decoded instruction in accordance with their opcodes, operating on any respective operand(s) and outputting any result(s) of the instruction to one or more of the operand registers.

The execution unit 18 is configured to execute instructions from a certain instruction set, i.e. a predefined set of instruction types recognized by the execution unit 18. These will include a load instructions and a store instructions, and/or one or more types of combined load-store instruction. The instructions set will also include a number of arithmetic instructions such as add, multiply, etc. An arithmetic instruction, when executed, takes one or more input values from one or more of the operand registers (the source register(s)), performs an arithmetic operation thereon, and places the result(s) in another one or more of the operand registers (the destination register(s)). A load (or load-store) instructions, when executed, loads data from the data memory 22 into one or more of the operand registers to be operated on by other types of instructions such as arithmetic instructions. A store (or load-store) instruction stores results from one or more of the operand registers to the data memory 22. Other types of instruction are also known. For instance a pseudorandom number generating instruction ("rand" instruction), when executed, will generate a pseudorandom number and place this in a destination one of the operand registers. Get and put instructions are used to read and write values to registers such as the control state registers.

The state in the control state registers may affect the execution of one or more types of instruction. For instance the control state registers may comprise a rounding mode register for holding a rounding mode value, which controls a rounding mode used by one or more types of arithmetic instruction (e.g. stochastic rounding, round to zero, or round to nearest). The rounding mode can be set by executing a put instruction to put a value to the rounding mode register. In another example the CRSs may include a seed register, and the pseudorandom number generated by the rand instruction will be dependent on a seed value held in the seed register. The seed value can be set by executing a put instruction to put a value to the seed register.

In embodiments the processing unit on each of the tiles 4 is a multithreaded processing unit for running multiple concurrent threads on the tile 4. In this case the registers 26 comprise a separate set of context registers 26W_0 . . . 26W_K−1 for each of the K threads the execution unit 18 is capable of interleaving (i.e. running concurrently). At least some of the threads may be worker threads for performing a certain task or tasks, such as to perform a portion of the work allocated from the first subsystem 93. Each of the K sets of context registers 26W_0 . . . 26W_K−1 is arranged to represent the context (program state) of a different respective one of the concurrent threads. The fetch stage 14 is arranged to fetch instructions from each of the different concurrent threads in turn, in a round robin fashion, and pass them through the rest of the pipeline 13 to be executed in an interleaved manner by the execution unit 18. Thus each of the concurrent threads gets a different respective time slot in a repeating execution schedule of interleaved time slots. In embodiments each slot may be the same length, e.g. one instruction issue cycle per slot, or alternatively in the case of a weighted round robin scheme the slots could be different lengths.

When executing an instruction of a given thread in a given slot, the pipeline 13 uses the respective set of context registers 26W of the context of the respective thread. I.e. so the fetch stage 14 fetches the next instruction for the currently scheduled thread from a point specified by the respective PC of that thread, and the execution unit 18 uses the respective operand registers of the respective thread when executing instructions of that thread. Thus the different sets of context registers 26W_0 . . . 26W_K−1 enable a separate program state to be maintained for each of the different concurrent threads being interleaved at any given time. Some or all of the CSRs may also be per thread, or some or all of the CRSs could be global to all threads.

In some embodiments, the context registers 26 also comprise an additional set of context registers 26S, i.e. one more than the number K of threads the processing unit 10 is capable of executing concurrently (one more than the number of interleaved time slots it supports per round of the round-robin schedule). This set of context registers 26S is reserved for representing the context (program state) of a supervisor thread, and the other sets 26W_0 . . . 26W_K−1 are reserved for representing the state up-to K worker threads. The supervisor may begin running in some or all of the K time slots, then may relinquish one, more or all of its slots to respective workers (i.e. so the workers then run in those slots). In embodiments the supervisor can do this by executing a run instruction in the respective slot. Once a worker has finished its task (e.g. a codelet), it may then hand back its slot to the supervisor (so the supervisor continues running in that slot again). In embodiments each worker can do this by executing an exit instruction in its respective slot. The supervisor thread may perform one or more supervisory operations, such as to communicate or coordinate communication between tiles 4, between chips 2, and/or between the first and second subsystems 93, 300. E.g. this coordination may comprise performing barrier synchronizations to implement a scheme such as BSP for synchronizing between the tiles 4, processors 2 and/or subsystems 93, 300. In embodiments, one or more global CSRs that affect all the threads may be implemented as CSRs in the supervisor context registers 26S.

In embodiments, each of the worker threads may be arranged to perform the computations of a different respective node in a neural network. With multiple threads across each of multiple tiles 4 and/or chips 2, this provides for a great deal of concurrency and parallelism to support machine learning applications. Further, in embodiments, the interconnects 34, 72 are designed to enable interconnectivity between any combination of tiles 4 and/or chips 2 within the second subsystem 300, and/or between the first subsystem 93 and any one of the tiles 4 and/or chips 2 in the second subsystem 300. Of course it will be appreciated that this is just one exemplary application of the techniques disclosed herein.

Figure 2:
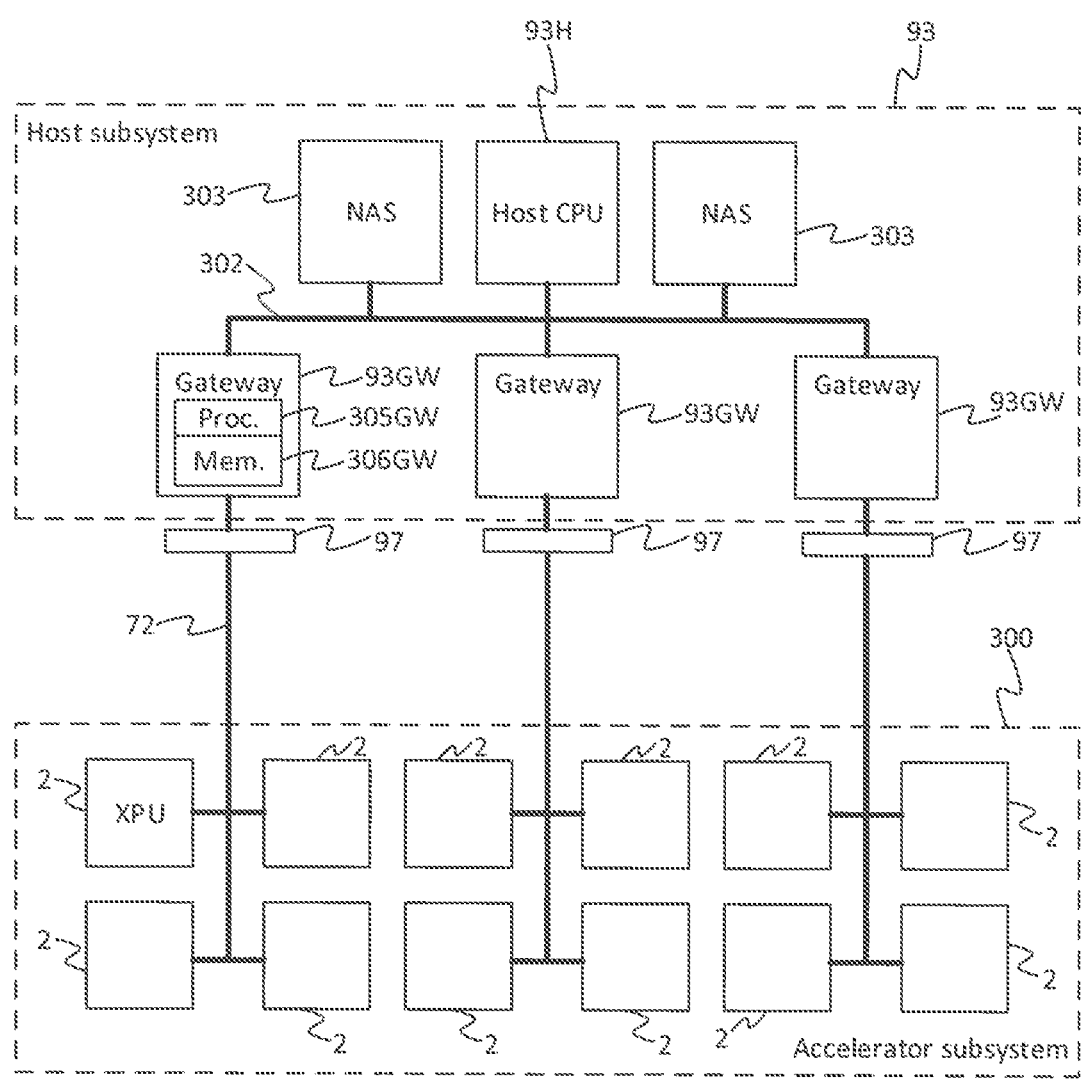
FIG. 2 is another schematic block diagram of a host and accelerator subsystem.

FIG. 2 illustrates an example variant of the system shown in FIG. 1. Here the host subsystem 93 comprises a plurality of first processors, e.g. a host processor (host CPU) 93H and one or more gateway processors 93GW. The host processor 93H comprises a respective processing unit 305H and memory 306H as described in relation to FIG. 1. Each of the gateway processors 93GW also comprises a respective processing unit 305GW and memory 306GW. The one or more gateways 93GW are arranged as intermediaries between the host CPU 93H and the accelerator processors 2. Each gateway 93GW is connected to one or more of the accelerator processors 2 via the host interface 97 and the interprocessor interconnect 72. E.g. each gateway 93 may be connected to a different respective subset of one or more of the accelerators 2 via a respective instance of the host interface 97 and a different respective part of the interprocessor interconnect 72, as shown. Alternatively it is not excluded that a given accelerator 2 could connect to the host subsystem 93 via multiple gateways 93GW. Either way, each of the gateways 93GW is connected on the other side to the host CPU 93H. This connection may for example be via a host network 302, e.g. a PCI, PCIe or Ethernet network. One or more of the gateways 93GW may also be connected to one or more network attached storage devices (NASs) 303, i.e. storage drives such as hard disks or flash drives. For example the NASs may also be connected on the host network 302.

The gateway(s) 93GW may have any one or more of a number of roles. For instance, in embodiments, one or more of the gateways 93GW are arranged to act as buffers for streams of data such as sequences of images, audio streams or other streams of experience data which are to be streamed to the accelerator processors 2 in order for the accelerators 2 to conduct machine learning based thereon; e.g. to train a neural network to identify objects, faces, or sounds, etc., in the received experience data. The use of the gateway 93GW in this way may be desirable since it relieves the resources of host memory 305H. Instead at least some of the data destined for the accelerators 2 is buffered in the respective memory 306GW of the gateway(s) 93GW in question. In some cases the gateway(S) 93GW may be arranged to retrieve some or all of the streams directly from one or more of the NASs 303, e.g. via the host network 302, rather than the data having to go through the host memory 305H.

Alternatively or additionally, in embodiments one or more of the gateways 93GW may be arranged to pre-process the data (e.g. streams of experience data) prior to supply to the accelerator processors 2. For instance this pre-processing may comprise decoding, decrypting, decompressing and/or conditioning the data. E.g. in the latter case, the conditioning may comprise adding deliberate pseudorandom noise to the experience data. This is known to help improve the ability of a machine learning algorithm (in this case run on the accelerators 2) to form generalizations from the experience data rather than just memorize the experience data. Offloading such pre-processing to the gateway(s) 93GW advantageously relieves the host CPU 93H from such tasks.

The following teachings may apply to an arrangement such as that shown in FIG. 1 with a single host or first processor 93H, or an arrangement such as that shown in FIG. 2 with multiple processors in the host or first subsystem 93, e.g. a host CPU 93H and one or more gateways 93GW. FIGS. 1 and 2 are included for illustrative purposes and should not be construed as limiting.

One issue to consider in designing a computer system is how to deal with memory errors. This can be particularly an issue in large scale systems distributed between two or more subsystems, especially (but not exclusively) in highly parallel and/or concurrent systems which require corresponding memory resources to support all of the parallel and/or concurrent processes. The following describes some software mechanisms to handle these errors.

In embodiments the second processors (e.g. IPU chips 2) do not have ECC memory correction but do have parity error detection. I.e. the memory 10 on each of the second processors 2 is not ECC protected memory whereby each word is protected by a redundant error correction code (EEC)

enabling correction in the case of a corrupt bit, but rather only a parity bit enabling detection but not correction of the corrupted bit. This means that a computation is not guaranteed to succeed but it can be detected if an error has occurred (as long as only one or an odd number of bits has flipped). This represents a change for applications that currently target devices with error correction since the software needs to handle these errors which are likely to be more frequent than other hardware failures. However, ECC memory is slower and consumes more silicon area. Also, ECC memory is still not fool-proof anyway: statistically speaking over a large system, there is bound to be an uncorrectable memory error eventually (where the redundant error correction codes are still not sufficient to correct the error). For instance this is bound to occur eventually or even regularly in a large data centres. In embodiments herein, it may be preferred not to incur the performance penalty and silicon footprint of ECC memory; and instead to employ only an error detection mechanism such as a parity-check mechanism in the memory 10 of each second processor 2, combined with a software-layer checkpointing mechanism to recover the program in event of errors.

The simplest option would be to simply pass the error up to the application. When the application asks a computation to occur via a host engine type, e.g. Engine.run(0), an exception may occur which signals that a memory error has occurred. The application will then reset the device and handle recovery in whichever way it deems fit. The exception will detail that it is a memory error and have may some indication of how far it progressed through the program. If the application needs to checkpoint to aid recovery it can do so via the normal provided mechanisms within for getting data on and off chip.

The next step beyond just basic error reporting would be to allow the user to checkpoint and recover. For the user this could simply be an option to graph compilation (Engine creation) that enables checkpointing. There may be further options to enable/disable the saving and restoring of PRNG state within this. The engine class would include extra methods to checkpoint and restore the state of the device. With this option it would still be the host application's responsibility to decide when to checkpoint and to handle recovery from a signalled error.

It would be preferable however to provide more seamless recovery. In embodiments, all data transfer to/from the second subsystem 300 is managed by the control program on the host 93. This raises the option to fully recover from memory error without the application having to intervene. In this case the user experience may simply be a user option to enable seamless checkpointing and recover. After enabling this option, calling Engine:run will never fail with a memory parity error but may occasionally take longer to run as it replays computation to recover within the host runtime.

To implement such a feature or similar, the control program (first program) running on the first subsystem 93 (e.g. host) is configured to automatically checkpoint the state of the second subsystem at each of a series of points in time. In addition it is configured to record all incoming data transmitted from the host 93 to the second processors 2. At the point of failure it will automatically recover the state and replay computation up to the point of failure. During this replay, all input data will be replayed into the second processors 2 and all output data will be thrown away (it will have already been passed to the host application). Consider for instance an image recognition CNN (convolutional neural network) running on an accelerator subsystem 300 with sixteen IPUs 2 on a cluster. Checkpointing state in this system may take ~100 ms. So checkpointing at approximately every 4 seconds will lead to only ~2.5% degradation in runtime performance.

For example, consider a scenario where the system will be processing ~30,000 images per second with each image being ~300 KBytes. This means that the incoming data stream will consume ~34 GBytes of data in 4 s which is saveable on a suitably endowed host machine.

This represents the current extreme in terms of incoming data, other applications will require less storage. There will also be an overhead on the host 93 to save and manage this data. During training, this means that each memory parity error could cause up to $4s$ of extra time being taken to run the program which seems acceptable since the expected frequency of error is small. For inference scenarios this represents a loss of latency of response for some inferences which again needs to be within the QoS bounds of the service being managed.

The checkpointing may be implemented as follows. Embodiments may be described in relation to an example where the first subsystem 93 takes the role of a host subsystem comprising at least a host CPU 93H, and where the second subsystem takes the role of an accelerator subsystem comprising one or more accelerator processors 2, each optionally comprising one or more tiles 4. However it will be appreciated that the checkpointing techniques disclosed below or elsewhere herein are not limited to the case where the first subsystem 93 and second subsystem 300 have a host-accelerator relationship.

The first program, comprising the host control program on the host CPU 93H, is configured to automatically place a checkpoint at each of plurality of points in time throughout the running of the second program on the accelerator subsystem 300. This could be at regular intervals, random intervals, in response to certain events or at defined points in the program, or a combination of any of one or more of these. In embodiments the checkpoints may be placed immediately after each of one or more synchronization barriers 30, 80, e.g. in a BSP scheme. In some programs if the amount of processing between barriers is approximately the same with each superstep, then this will result in the checkpoints being placed at approximately regular intervals in time.

Setting or placing a checkpoint, in the present disclosure, comprises at least two things. Firstly, it comprises recording a program state of the accelerator program running on the accelerator subsystem 300. This may comprise some or all of the total program state of the second program, depending on what is required for recovery. The recorded program state will comprise at least the state of one or more of the registers 26 used by the accelerator program (i.e. the value(s) stored in that/those registers). When the host control program run on the host CPU 93H determines that it is time to set a checkpoint, the host control program sends a checkpoint signal from the host CPU 93H to the one or more accelerator processors 2 in the accelerator subsystem 300 that are to be checkpointed, e.g. this signal being sent via the external interconnect 72 and host interface 97. In embodiments this could be all the accelerator processors 2. The accelerator program run on the accelerator processor(s) 2 being checkpointed is configured so as, in response to the checkpoint signal, to read the register state of the checkpointed register(s) on the accelerator processor(s) 2 and report this to the host CPU 93H (e.g. again via the external interconnect 72 and host interface 97). The host control program on the host CPU 93H then records the received state in one or more memories 306, 303 of the host subsystem 93. In embodiments this may be recorded in the internal memory 306H of the host CPU 93H. However it could instead be recorded in a networked storage device 306, or a combination. Note also that while described by way of example as being performed by the host CPU 93H, any of the embodiments herein could more generally be performed by any processor in the host subsystem 93, e.g. a gateway processor 93GW.

In embodiments that comprise multiple accelerator processors 2, the checkpointed state may comprise the state of one or more of the registers 26 from each of one, some or all of the accelerator processors 2. In embodiments that comprise multiple tiles 4 per accelerator processor 2, the checkpointed state may comprise the state of one or more of the registers 26 from each of one, some or all of the tiles 4 on each checkpointed accelerator processor 2. In embodiments that employ multi-threading per processor 2 or per tile 4, then the checkpointed state may comprise the state of one or more of the context registers 26 of each of one, some or all of the threads; e.g. one or more registers from each worker context 26W_0 . . . 26W_K-1, and/or one or more registers of the supervisor context 26S. In embodiments the checkpointed state may comprise the state of at least one register 26 is common to some or all of the threads on the same tile 4, or to some or all of the tiles 4 or threads on the same processor 2. E.g. in embodiments the supervisor registers 26S comprise one or more control state registers (CSRs) that also affect the workers.

The checkpointed state is stored in the host memory 303/306 along with some indication of how far the accelerator program has progressed at the time of the respective checkpoint. If checkpoints can be placed at any arbitrary point, then the point in the program could be measured and recorded in terms of program counter (PC) value. Alternatively checkpoints may be placed between discrete steps or code portions in the accelerator program, and the point in the program could be measured and recorded in terms of how many steps or portions have been completed. E.g. checkpoints may be placed between BSP supersteps and the point in the program may be measured and recorded in terms of the number of supersteps that have elapsed (discussed in more detail shortly). As another example, the program may be divided into a number of codelets (atomic portions of code), in which case checkpoints may be placed between codelets, and the point in the program may be measured and recorded in terms of the number of codelets that have been completed.

Note: where it is said that a checkpoint is set or placed at certain time intervals, or such like, this does not necessarily mean that any but the most recent checkpoint data is maintained. In embodiments, upon setting the current checkpoint, some or all of the data from the preceding checkpoint may be discarded, e.g. overwritten, deleted or marked for deletion.

In embodiments, the or each accelerator processor 2 comprises a pseudorandom number generator (PRNG) implemented in dedicated hardware circuitry, which can be invoked by execution of a random number instruction ("rand"). In embodiments that employ multiple tiles 4 per accelerator 2, there may be provided a separate PRNG per tile 4. Each PRNG has an associated seed register in the registers 26 on the respective processor 2 or tile 4. When the execution unit 18 on the respective tile 4 or processor 2 executes an instance of the rand instruction, it causes the PRNG to generate a random number based on the seed value in the respective associated seed register, and then to advance the seed value in the seed register for next time. Methods for generating pseudorandom numbers based on seed values are, in themselves, known in the art.

In embodiments of the present disclosure, the checkpointed state comprises at least the seed value in at least one of the one or more seed registers. In embodiments, there may be provided a PRNG and respective associated seed register onboard each of the accelerator processors 2, or each of the tiles 4. In this case the checkpointed state may comprise one, some or all of the seed values from the respective seed registers. In embodiments, there may be provided one PRNG and only one associated seed register per tile 4, for storing only one seed value among all threads on each given tile 4 at any given time (though since the seed is advanced whenever one thread executes a rand instruction, then the threads end up using different seed values at different times). In embodiments the seed register is one of the CSRs of the supervisor thread in the set of supervisor context registers 26S, and this same seed register seeds random numbers generated by both the supervisor and the workers. Alternatively however, the possibility of a seed register per thread is also not excluded (i.e. one per set of worker thread context registers 26W_0 . . . 26W_K-1). In the latter case, the checkpointed state may comprise one, some or all of the threads' seed registers (on one, some or all of the tiles 4 and/or accelerator processors 2).

In embodiments, the or each accelerator processor 2 may comprise rounding logic for applying an adaptable rounding mode when executing one or more types of arithmetic instruction in the processor's instruction set. This rounding logic has an associated register among the registers 26 on the respective processor. In embodiments there may be a separate instance of the rounding logic and respective associated rounding mode register provided in each tile 4. When the execution unit 18 on the respective tile 4 or processor 2 executes an instance of one of the one or more types of arithmetic instruction affected by the rounding mode, then it performs the associated type of arithmetic operation, and causes the rounding logic on the respective processor 2 or tile 4 to apply a specified type of rounding to the result of this arithmetic operation. This will typically apply to at least one or more types of floating point arithmetic instruction where the result is a floating point value. The type of rounding is specified by a rounding mode value held in the respective rounding mode register. For example, the different possible rounding modes may comprise a stochastic rounding mode, a round-to-zero mode, and/or a round-to-nearest mode. Techniques for performing different types of rounding to the results of arithmetic operations are, in themselves, known in the art.

In embodiments of the present disclosure, the checkpointed state comprises at least the rounding mode value in at least one of the one or more rounding mode registers. In embodiments, there may be provided an instance of the adaptable rounding logic and respective associated rounding mode register onboard each of the accelerator processors 2, or each of the tiles 4. In this case the checkpointed state may comprise one, some or all of the rounding modes from the respective rounding mode registers. In embodiments, there may be provided one instance of the adaptable rounding logic and only one associated rounding mode register per tile 4, for specifying only one rounding mode value among all threads on each given tile 4 at any given time (though the rounding mode value may be varied between instructions executed in different threads). In embodiments the rounding mode register is one of the CSRs of the supervisor thread in the set of supervisor context registers 26S, and this same rounding mode register sets the rounding mode for any arithmetic instructions executed by both the supervisor and the workers. Alternatively however, the possibility of a rounding mode register per thread is also not excluded (i.e. one per set of worker thread context registers 26W_0 . . . 26W_K−1). In the latter case, the checkpointed state may comprise one, some or all of the threads' rounding mode registers (on one, some or all of the tiles 4 and/or accelerator processors 2).

In embodiments the checkpointed state does not comprise the program counter (PC) value for any of the processors 2, tiles 4 or threads. Instead, the checkpointed point in the program is recorded in some other terms, such as the number of barriers, BSP supersteps or codelets that have elapsed. Alternatively the checkpointed state could include the PC value of each processor 2, or each tile 4 in a multi-tile arrangement, or each thread on each processor 2 or tile 4 in a multithreaded arrangement. This will allow checkpointing at any arbitrary point in the accelerator program.

In embodiments the checkpointed state does not comprise any state of the operand registers. Instead, checkpoints are placed only between portions of code (e.g. codelets) that do not assume any operand state prior to being launched. A codelet does not expect any pre-existing state of operand registers. Typically a codelet is dependent on state of a certain part of memory (the area the codelet reads from being predefined by the compilation). In this case the checkpointed state will also need to include the state of the relevant area of memory. However, this not necessarily the case. Checkpoints could be placed only between portions of code that do not assume any pre-existing memory contents prior to being launched. In this case there would be no need to store any memory contents from the memory or memories 11 of the accelerator subsystem 300 as part of the checkpoint.

In the case of an accelerator subsystem comprising multiple parallel processors 2, multiple parallel tiles 4, or multiple concurrent threads, such arrangements may require a barrier synchronization to bring all the parallel and/or concurrent pieces of code to a common juncture before the checkpoint can be placed. An example of this will be discussed in more detail later. In alternative embodiments, the checkpointed state may comprise the state of one or more of the operand registers of one or more of the processors 2, tiles 4 and/or threads. And/or, the checkpoint may also compromise storing the memory contents from the data memory 22, or from the or each processor 2 or tile 4. This will allow checkpointing at any arbitrary point in the accelerator program.

The host program on the host CPU 93H is configured to automatically detect a replay event occurring on the accelerator subsystem 300. This may comprise a memory error occurring in the memory 11 (data memory 22 or instruction memory 12) of any of the processors 2 or tiles 4. As mentioned, in embodiments the memory 11 on each chip 2 or tile 4 is equipped with an error detection mechanism, such as a parity check mechanism. This means that each word, or other such portion of data content stored, in the memory 10 is automatically tagged with a piece of redundant data generated based on that data, such as a parity bit or checksum. The memory 11 further comprises an automated hardware logic that checks, throughout operation, whether the stored value of the redundant data matches a currently evaluated version generated based on value of the associated data currently found in memory 11. If not, the memory check logic automatically raises an exception which is signalled to the host CPU 93H subsystem 93. This will then be detected as a replay event by the host CPU 93H. This mechanism may apply to the data memory 22, instruction memory 12, or both. It may be applied across any one, some or all of the tiles 4 and/or processors 2 in the accelerator subsystem 300.

To signal the occurrence of the error, the system-on-chip (SOC) circuitry of each accelerator processor 2 may comprise a dedicated exception signalling path or network (not shown) which connects to a suitable interface circuit such as a PCI controller in the host interface 97. When a processor 2 or tile 4 attempts a read or write to memory and the error detection mechanism detects a memory error, this automatically generates a strap which is signalled via the exception signalling path to the host PCI controller, from where the host CPU 93H detects this and based thereon instigates a replay.

As another example, the replay event may comprise a power failure on the accelerator subsystem 300. In embodiments the accelerator subsystem 300 may be equipped with a power failure detection module arranged to detect failure in a supply of power to the accelerator subsystem 300, or in embodiments to individual ones of the accelerator processors 2. When it detects such a power failure, the power failure detection mechanism automatically signals this to the host CPU 93H. This will then be detected as a replay event by the host CPU 93H. E.g. this may be signalled and detected via a fault signalling path and a similar connection to circuitry (e.g. PCI controller) in the host interface 97 as described in relation to the memory error.

The host program on the host CPU 93H is configured so as, when it detects a replay event, to automatically re-load the checkpointed state back into the respective register(s) of the accelerator subsystem 300 (i.e. the register(s) from which that state was originally recorded as part of the checkpoint that is now being restored). It also automatically controls the second subsystem 300 to replay (i.e. re-run) the accelerator program on at least part of the accelerator subsystem 300 from the point of the last checkpoint; e.g. from the time of the last checkpoint, or from the last synchronization barrier, or from the start of the current BSP superstep, or from the PC of the last checkpoint, depending on how the checkpoint was recorded. When replayed, the accelerator subsystem (or part thereof) replays the accelerator program (or the respective part thereof) using the re-loaded program state from the respective register(s) of the accelerator subsystem 300.

In embodiments, if memory contents were checkpointed as well, then these are automatically stored back into the respective memory or memories 11 of the second subsystem 300 (i.e. back into the memory location from which it was originally recorded as part of the checkpoint that is now being restored). This may comprise replaying the first program (or a part thereof) on the first subsystem 93, from the point in the first program at which of the last checkpoint, in order to re-send the data from the first subsystem 93 to the memory 11 of the second subsystem 300. Alternatively the data could be re-sent from the first subsystem 93 by a separate event handling routine of the first program. Either way, the accelerator subsystem 300 (or part thereof) then replays the program (or respective part thereof) also using the re-stored memory contents.

Note: in embodiments, the checkpointing comprises checkpointing all the tiles 4 and/or accelerator processors 2 together, and the replay comprises replaying the accelerator program across all processors 2 and (where multi-tiled) all tiles 4. So if there's an error on just one tile 4 or processor 2, the system will still replay across the whole array, not just the failing processor 2 or tile 4. Alternatively, a greater resolution may be provided in the checkpointing and replay.

I.e. the checkpointed state is recorded separably for each processor 2 or even each tile 4, and the replay may comprise replaying the respective part of the accelerator program only on a selected one or a subset of the processors 2 or tiles 4.

In further alternative or additional embodiments, similar mechanisms can also be used to recover from other types of exceptions such as overflows and divide-by-zeros. Further, the use of the checkpointing and replay is not limited to an automatic recovery mechanism. Alternatively or additionally, it can also be used to support manual replay events such as a manual intervention by a developer, e.g. as part of a debugging process.

For instance the above checkpoint & restore mechanism may be used to enable a "time-travel debugging" feature. I.e. the user can select to manually step back to the point of the last checkpoint (or even a previous checkpoint if those are not deleted or overwritten each time). This may be very effective for user productivity. Debugging tools may be provided that let the user step through the control program and inspect machine state. If the checkpointing and data stream recording is implemented, users will be able to move both forwards and backwards through the control program giving a very powerful debugging experience.

In embodiments, the program on the first (e.g. host) subsystem 93 may delete one or more old checkpoints so as to save space in the memory 306H of the first subsystem. It could keep only the single most recent checkpoint, or multiple old checkpoints. For example, the program on the first subsystem 93 may be configured to keep a "running window" of checkpoints going back a predetermined amount of time into the past. This could be the checkpoints going back a predetermined amount of time into the past from the current point in time (e.g. keep all checkpoints from the last 10 ms, or last minute or hour, etc., and discard older checkpoints). Alternatively the window could be defined as a predetermined number of checkpoints prior to the current checkpoint (e.g. keep the last 10 checkpoints and discard any older than that). Either way, the checkpoints that are kept from within the current window could be all the checkpoints within that window or just a selection of them (e.g. keep every 10th checkpoint or a random selection of checkpoints from the last 1 hour or from a window going back 1000 checkpoints). The amount of time into the past or the number of checkpoints in a window may be determined by a program, such as the program on the first subsystem 93. For instance, the size of a window may be hard coded in the program on the first subsystem 93, may be adaptable during runtime, maybe set by a human user, or may be set by any other appropriate technique.

Alternatively or additionally, the first subsystem 93 may keep at least two checkpoints: the most recent checkpoint, and the oldest checkpoint from which it may want to recover the program on the second subsystem 300 (e.g. a checkpoint at the beginning of the second program). It may also keep one or more checkpoints in between, such as by keeping the running window (for example the 10 most recent checkpoints or all checkpoints in the last 10 ms, last 1 s, last 1 min, last 1 hour or last 24 hours, etc., or a selection of checkpoints within such a window).

One reason for storing a series of checkpoints, including at least one in between the oldest and the newest, is to optimize the time to recover to a previous state in the case where it is desired for a developer or such like to select to go back to checkpoint earlier than the latest checkpoint. For example, say the host 93 stores a series of ten checkpoints: $c_1, c_2, c_3 \ldots, c_{10}$. The host still needs to store all the input stream data from $c_1$. However, compare this to just storing $c_1$: in either case the host 93 can restore any state between $c_1$ and now via a replay, but if one or more intermediate checkpoints ($c_2 \ldots c_9$) have been kept, it may be possible to restore from a newer checkpoint—thus reducing restore time. Note that if it is desired to restore historic state, one might store at least two checkpoints anyway to ensure a certain amount of history. I.e. when the host (or first subsystem) 93 captures a "fresh" checkpoint, it also keeps at least one previous checkpoint to ensure that it can go back a certain amount of time.

The following now describes a scheme for integrating the checkpointing within a BSP scheme for synchronizing between multiple processors 2 and/or tiles 4. Reference is made to concepts illustrated schematically in FIGS. 3 to 5.

Figure 3:
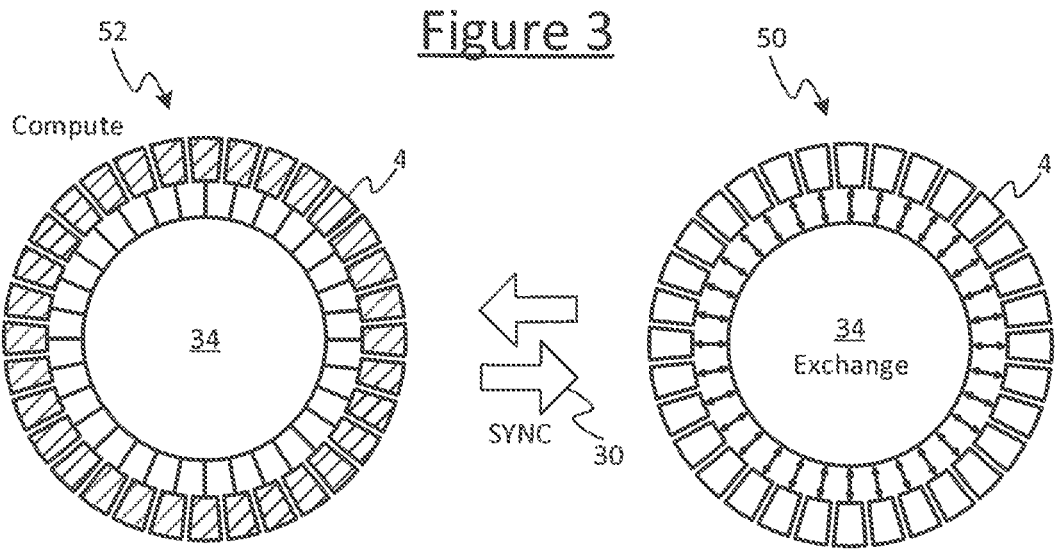
FIG. 3 is a schematic illustration of a BSP scheme.

The general principle of BSP is illustrated in FIG. 3. This can apply to the synchronization between some or all of the accelerator processors 2 in an arrangement of multiple accelerator processors as in the accelerator subsystem 300, or to synchronization between tiles 4 within a given multi-tile processor 2. Put another way, the BSP scheme can apply at one or more of a plurality of different hierarchical levels of parallelism. FIG. 3 illustrates the case of synchronization between multiple tiles 4, but it will be appreciated that the discussion can apply equally at the level of different accelerator processors 2.

Figure 4:
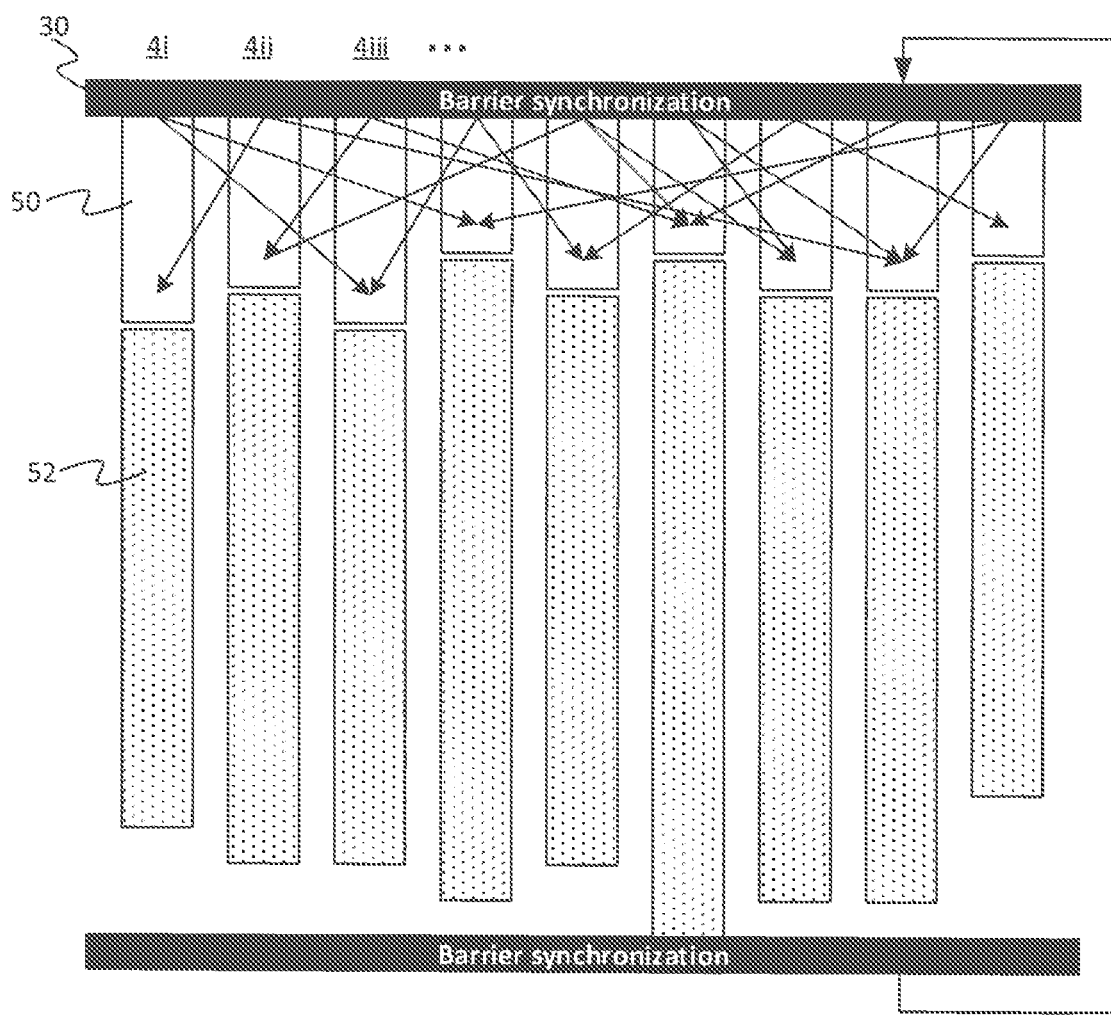
FIG. 4 is another schematic illustration of a BSP scheme.

A group of some or all of the tiles 4 are configured to operate in a series of bulk synchronous parallel (BSP) supersteps. In embodiments the group may be some or all of the tiles 4 on a given accelerator processor 2, e.g. same chip (in some cases a mechanism may be provided to allow some of the tiles 4 to opt out of the group). As shown in FIGS. 3 and 4, each superstep comprises an exchange phase 50 followed by a compute phase 52. In each compute phase 52, the tiles 4 perform internal computations but do not exchange results of these computations between tiles 4. The compute phase can optionally also comprise some internal communication between threads in the case of a multi-threaded tile 4. In each exchange phase 50, the tiles 4 are allowed to communicate such computation results between one another (the exchanged results resulting from a preceding compute phase 52 of a preceding superstep). In each superstep, the compute phase 52 of the current superstep is separated from the exchange phase 50 of the next superstep by a barrier synchronization 30 (also called a synchronization barrier, or just a barrier). This means the processor 2 is configured such that all the tiles 4 in the group must complete their respective computations of the current compute 52 phase before any of the tiles 4 in the group is allowed to advance to the next exchange phase 50.

In embodiments the internal interconnect 34 may comprise some dedicated hardware for coordinating this. Each tile 4 in the group is programmed so as, when it has completed its respective computations of the current compute phase, it will executing a suitable instruction or instructions to send a sync request message to the interconnect 34 and then pause instruction issue until the tile 4 receives back a sync acknowledgement (sync ack) in response. E.g. in embodiments this may be enacted by executing a single dedicated sync instruction on the tile 4. This may be the responsibility of the supervisor thread. In embodiments the supervisor thread will only send the sync request once all the worker threads on the respective tile 4 have completed their task or tasks for the current compute phase 52. The logic in the interconnect 34 is configured so as to return the sync ack to all the tiles 4 in the group on condition of receiving the sync request from all the tiles 4 in the group.

Note: in the literature the term "superstep" is not always used consistently—sometimes each of the compute and exchange phases is referred to as a superstep, whereas sometimes the exchange phase and compute phase together are referred to as a superstep. The latter terminology is adopted herein.

In embodiments, the computations performed by each given tile 4 in the group in a given compute phase 52 consist of a discrete number of one or more codelets. In embodiments, the task or tasks performed by each thread on each tile 4 in the group in a given compute phase 52 consist of a discrete number of one or more codelets. I.e. the work performed by each tile, and in the multi-threaded case each thread, in a given compute phase consist of only a whole number of codelets. A codelet is an "atomic" piece of code. It has all the input information it needs to execute from the beginning (from the time of being launched), i.e. it does not take any input from any other part of the program after being launched. Further, no other part of the program will use any outputs (results) of the codelet until it has terminated (finishes). Unless it encounters an error, it is guaranteed to finish. N.B. some literature also defines a codelet as being stateless, i.e. if run twice it could not inherit any information from its first run, but that additional definition is not necessarily adopted here. In some embodiments however, each codelet is also not dependent on the state of any operand registers from before it was launched. This means that only a small amount of persistent state needs to be saved at each checkpoint, such as a PRNG state and/or arithmetic rounding mode. Typically though, a codelet is dependent on the contents of a defined area of memory allocated to the respective codelet, which may comprise content from before it was launched. Therefore in embodiments the content from the respective are of memory is recorded as part of the checkpoint.

In embodiments each worker thread is formed from a discrete number of whole codelets. This means that it is not necessary to save the worker register state in the worker context registers 26 at any checkpoint. However it may still be required to save the state of the supervisor program from at least some of the supervisor context registers 26S.

Figure 5:
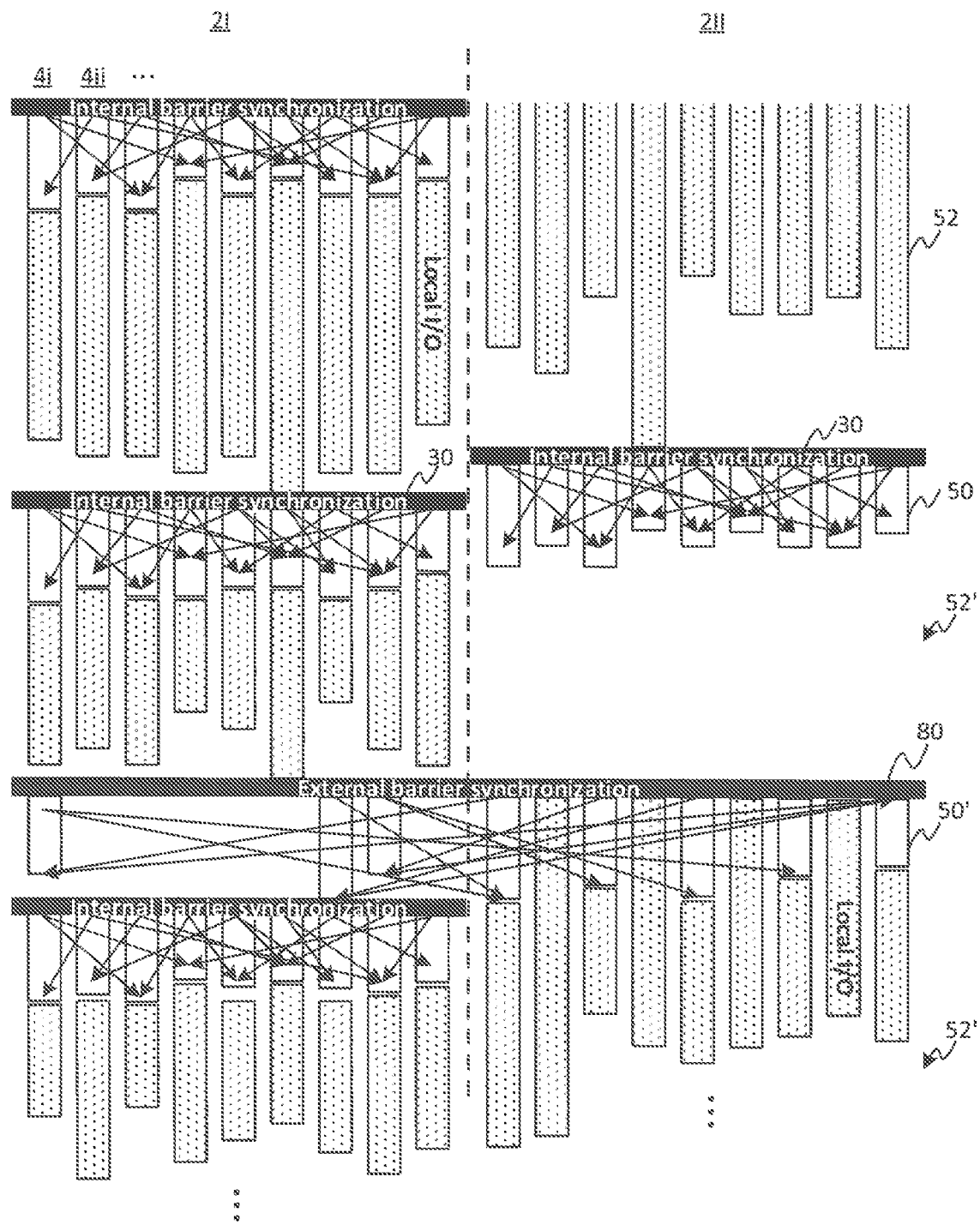
FIG. 5 is a schematic illustration of a multi-layer BSP scheme.

FIG. 5 illustrates how the BSP principle can be extended across multiple accelerator processors 2 in the case where each accelerator 2 comprises multiple tiles 4. In this case multiple hierarchical levels of BSP may be implemented. At the level of the accelerator subsystem 300 as a whole, synchronization between accelerator processors 2 (e.g. different chips) may be performed according to a higher, subsystem level of BSP. Each of a group of some or all of the accelerator processors 2 is configured to operate in a series of higher, subsystem-level BSP supersteps, each comprising a subsystem-level exchange phase 50' followed by a subsystem-level compute phase 52'. In the compute phase 52' the processors 2 perform internal computations but do not exchange results of these computations between processors 2. The compute phase 52' at this level can also comprise some internal communication between tiles 4 on the same processor 2. In each exchange phase 50' the processors 2 are allowed to communicate such computation results between one another (from a preceding compute phase 52' of a preceding superstep at the subsystem-level). In each superstep, the compute phase 52' of the current superstep is separated from the exchange phase of the next superstep 50' by a subsystem-level barrier synchronization 80. This means the accelerator subsystem 300 is configured such that all the processors 2 in the group must complete their respective computations of the current compute phase before any of the processors 2 in the group is allowed to advance to the next. This may be coordinated by dedicated hardware logic in the external interconnect 72 in a similar manner to that described in relation to the internal interconnect 34.

Each subsystem-level compute phase 52' may comprise one or more lower, processor-level BSP supersteps on each of one or more of the accelerator processors 2. Each such superstep comprises a processor-level exchange phase 50 for exchanging data between tiles 4 on the same processor 2, and a processor-level compute phase 52 in which tiles 4 perform on-tile computations. These operate as described in relation to FIG. 3: i.e. all the tiles 4 in a given processor have to finish their part of the current compute phase before any advances to the next exchange phase.

Note that in some scenarios a given superstep at either hierarchical level may comprise a null compute phase or a null exchange phase. Note also that in embodiments, some computations may be allowed in the exchange phase. Also there is preferably no barrier transitioning from exchange phase to compute phase, so each tile 4 or processor 2 can start its computations of the compute phase while others are still exchanging.

In embodiments, the checkpoints may be placed between some or all of the BSP supersteps, at either or both hierarchical level. That is, the checkpoint is placed after the barrier 30/80 and before the next exchange phase 50/50'. The program state and optionally memory contents are recorded by the host CPU 93H at this point, along with any subsequent data sent from the host subsystem 93 in the BSP superstep that immediately follows the checkpoint. This may be done in an external exchange part of the exchange phase, e.g. between the internal exchange and the next compute phase. Further, in embodiments, the recorded checkpoint comprises a record of which BSP superstep the program had reached at the time of the checkpoint (either in terms of the one it has just completed or the one it is about to begin at the time of the checkpoint). When the accelerator program is replayed, e.g. in response to an error, etc., it is replayed from the start of the last checkpointed superstep (i.e. the start of the superstep that immediately follows the last checkpoint).

It will be appreciated that the above embodiments have been described by way of example only.

For instance, the first and second subsystems do not necessarily have to have a host-accelerator relationship. Further, the second subsystem does not have to comprise multiple second processors on multiple chips, and/or nor does each second processor have to comprise multiple tiles. In general the idea of recording the transferred data content for checkpointing purposes can be applied to any system where a first subsystem of at least one processor (e.g. CPU) sends data to any second subsystem comprising any one or more second processors (e.g. which may be slaves or any other form of co-processor to the CPU). Similarly, the scope of the present disclosure is not limited to multi-threaded processors. More generally, the checkpointed register state may comprise the state of any one or more registers of a single-threaded or multiple threaded processor.

Further, while the presently disclosed techniques have a particular applicability to a system arranged to operate according to BSP scheme where the BSP sync point is also checkpointed, this is not limiting to all possible embodiments. Alternatively the disclosed techniques could also be applied in systems using other schemes for coordinating communication between processors, such as a post box or rendez vous approach.

More generally still, checkpoints may be placed at any point in any kind of program that runs on a second subsystem of one or more processors. For instance, the checkpoints may be placed at points in the program where the part of memory 22 used by the program is in a deterministic or predictable state, i.e. a knowable state. In other words it is possible to know what bits are where in which memory. This may be known as a state of "memory consistency". In contrast, if the processors 2 of the second subsystem 300 are going through a step of communicating between one another, or a processor 2 is communicating externally, then data may still be in flight over a non-time deterministic interconnect, in which case it cannot be known whether incoming data has reached its destination in memory yet. In a subsystem 300 of multiple processors 2, typically points of deterministic memory state or memory consistency will occur at synchronization points in between communication steps. However it would also be possible to create suitable points in a non-synced subsystem by flushing buffers and saving register state to memory. Alternatively the buffer and register state could be saved as part of the saved program state.

Further, while the presently disclosed techniques have a particular applicability to a machine intelligence application, the scope of the present disclosure is not limited to this. More generally the idea of checkpointing the transferred data could apply in any application whose implementation is distributed across two or more processing subsystems.

Other applications and variants of the disclosed techniques may become apparent to a person skilled in the art once given the disclosure herein. The scope of the present disclosure is not limited by the described embodiments but only by the accompanying claims.

The invention claimed is:

1. A processing system comprising:
   a first subsystem comprising one or more first processors, and
   a second subsystem comprising one or more second processors;
   wherein a first program is arranged to run on the one or more first processors, the first program being configured to send data from the first subsystem to the second subsystem;
   wherein a second program is arranged to run on the one or more second processors, the second program being configured to operate on the data sent from the first subsystem;
   wherein the first program is configured to set a respective checkpoint at each of one or more points in time, whereby at each checkpoint the first program records in a memory of the first subsystem i) a respective program state of the second program, comprising at least a state of one or more registers on each of the one or more second processors at the point in time of the respective checkpoint, and ii) a copy of the data sent to the second subsystem in a time since the respective checkpoint; and
   wherein the first program is further configured so as, upon detection of a replay event, to re-send from the first subsystem to the second subsystem the data recorded since a selected or most recent one of the one or more checkpoints, and to control the second subsystem to replay at least part of the second program on at least one of the one or more second processors from the selected or most recent checkpoint, starting with the respective recorded program state and operating on the re-sent data.

2. The processing system of claim 1, wherein the first program is configured to set a respective checkpoint at each of an ongoing series of points in time up to a current checkpoint at a current point in time, and wherein the first program is further configured to discard from the memory the respective program state and data for checkpoints prior to a predetermined window running backward from the current point in time or current checkpoint, wherein the predetermined window is defined as a predetermined length of time prior to the current point in time or a predetermined number of checkpoints prior to the current checkpoint.

3. The processing system of claim 1, wherein the second subsystem is arranged to operate over a sequence of steps, wherein between the steps of the sequence the second program has a deterministic memory state; and wherein the points in time at which the checkpoints are placed are between the steps of said sequence.

4. The processing system of claim 1, wherein the one or more second processors are a plurality of second processors; wherein the second subsystem is arranged to operate over a sequence of Bulk Synchronous Parallel (BSP) supersteps of a BSP synchronization scheme for synchronizing between the plurality of second processors; and wherein the points in time at which the checkpoints are placed are between the BSP supersteps.

5. The processing system of claim 1, wherein the one or more second processors comprises a plurality of tiles; wherein the second subsystem is arranged to operate over a sequence of Bulk Synchronous Parallel (BSP) supersteps of a BSP synchronization scheme for synchronizing between the plurality of tiles; and wherein the points in time at which the checkpoints are placed are between the BSP supersteps.

6. The processing system of claim 1, wherein the first subsystem further comprises one or more storage devices and/or gateway processors; and the first program is configured to perform the sending by controlling at least one of the one or more storage devices and/or gateway processors to send the data to the second subsystem, and is further configured to control the one or more storage devices and/or gateway processors to send a copy of the data to the one or more first processors; the first program being arranged to perform the recording of the data by recording the copy received from the one or more storage devices and/or gateway processors, and to perform the re-sending by sending from the one or more first processors.

7. The processing system of claim 1, wherein:
   the second program is arranged to operate in a series of phases, wherein each phase comprises a respective one or more codelets; and
   the first program is configured to set each checkpoint between an end of a respective one of the phases and a start of a next phase in the series.

8. The processing system of claim 1, wherein the one or more second processors comprise a plurality of second processors, and a respective part of the second program is arranged to run on each of the second processors; the replaying of the second program comprising replaying at least the respective part of the second program arranged to run on at least one of the plurality of second processors.

9. The processing system of claim 8, wherein the first program is configured so as, upon detection of the replay event, to control the second subsystem to replay the second program across all of the second processors from the selected or most recent checkpoint.

10. The processing system of claim 8, wherein the first program is configured so as, upon detection of the replay event, to control the second subsystem to replay only the respective part or parts of the second program on a selected subset of one or more of the second processors from the selected or most recent checkpoint.

11. The processing system of claim 8, wherein:
the respective part of the second program arranged to run on each second processor comprises one or more respective codelets, and the second program is arranged to operate in a series of phases with a barrier synchronization between at least two of the phases, the barrier synchronization preventing the second program advancing to a next phase until each of the one or more codelets on each of the plurality of second processors running codelets in a current phase have completed; and
the first program is configured to set each checkpoint between a respective barrier synchronization and the next phase immediately following the respective barrier synchronization.

12. The processing system of claim 8, wherein each of the second processors comprises a plurality of tiles, each tile comprising a separate processing unit and memory, and each arranged to run a respective portion of the respective part of the second program.

13. The processing system of claim 12, wherein the second program is arranged to operate in a series of Bulk Synchronous Parallel (BSP) supersteps, each superstep comprising an exchange phase and a compute phase following the exchange phase, whereby in each superstep:
in the compute phase the second processors perform only respective computations or internal exchanges between tiles but not exchanges between the second processors, and in the exchange phase the second processors exchange computation results between one another, wherein the compute phase is separated from the exchange phase of a next superstep by a barrier synchronization, whereby all the second processors must complete their respective computations of the compute phase before any of the second processors is allowed to proceed to the exchange phase of the next superstep, or
on each second processor, in the compute phase the tiles on said each second processor perform only respective computations but not exchanges between tiles, and in the exchange phase the tiles on said each second processor exchange computation results between one another, wherein the compute phase is separated from the exchange phase of a next superstep by a barrier synchronization, whereby all the tiles on any given one of the second processors must complete their respective computations of the compute phase before any of those tiles on the given second processor is allowed to proceed to the exchange phase of the next superstep;
wherein the first program is configured, in setting each checkpoint, to record which in the series of BSP supersteps the second program has reached at the point in time of the respective checkpoint; and
the first program is configured to set each of the checkpoints between the barrier synchronization and a following compute phase in a respective one of the supersteps, the replaying comprising replaying from a start of the compute phase of a selected or most recent recorded BSP superstep.

14. The processing system of claim 1, wherein the second subsystem comprises an error detection mechanism configured to detect an error in the second subsystem; and wherein the replay event comprises an error, the detection of the replay event comprising detection of the error by the error detection mechanism.

15. The processing system of claim 14, wherein each of the one or more second processors comprises memory used by at least part of the second program, and the error detection mechanism comprises a memory error detection mechanism for detecting errors in the memory of each of the one or more second processors; and wherein the replay event comprises a memory error in a memory of one of the one or more second processors, the detection of the error being by the error detection mechanism.

16. The processing system of claim 15, wherein the error detection mechanism comprises a parity check mechanism configured to detect the memory error based on a parity check of redundant parity bits included in the memory.

17. The processing system of claim 15, wherein the memory of each of the one or more second processors comprises no error correction mechanism for correcting errors in the memory based on redundant error correction codes included in the memory.

18. The processing system of claim 1, wherein the second subsystem comprises a power failure detection mechanism configured to detect a failure in a power supply of the second subsystem, and the replay event comprises a failure of the power supply, the detection of the failure being by the power failure detection mechanism.

19. The processing system of claim 1, wherein one or both of:
each of the one or more second processors comprises a pseudo random number generator, PRNG, arranged to generate a pseudo random number seeded by a seed value in a PRNG register of the second processor, wherein each recorded program state comprises the seed value in the PRNG register on each of the one or more second processors; and/or
each of the one or more second processors is configured to apply a rounding mode specified by a rounding mode value held in a rounding mode register of each second processor, wherein each recorded program state comprises the rounding mode value in a rounding mode register on each of the second processors.

20. The processing system of claim 1, wherein the first subsystem is a host subsystem and the one or more first processors is a host CPU; and the second subsystem is an accelerator subsystem, the one or more second processors being one or more accelerator processors arranged to perform work allocated by the host CPU.

21. The processing system of claim 1, wherein the second program comprises a neural network and the data comprises experience data, the neural network being arranged to learn based on the experience data.

22. A method of operating a first subsystem comprising one or more first processors; the method comprising, by running a first program on the first subsystem:
sending data from the first subsystem to a second subsystem comprising one or more second processors, wherein a second program is arranged to run on the one or more second processors, the second program being configured to operate on the data sent from the first subsystem;
setting a checkpoint at a point in time, including recording in a memory of the first subsystem i) a program state of the second program, comprising at least a state of one or more registers on each of the one or more second processors at the point in time of the checkpoint, and ii) a copy of the data sent to the second subsystem in a time since the checkpoint; and
upon detection of a replay event, re-sending from the first subsystem to the second subsystem the data recorded since the checkpoint, and controlling the second subsystem to replay at least part of the second program on at least one of the one or more second processors from the checkpoint, starting with the recorded program state and operating on the re-sent data.

23. The method of claim 22, wherein the checkpoint is a most recent checkpoint at detection of the replay event.

24. The method of claim 22, wherein the checkpoint is included within a running window of other checkpoints; the method further comprising: discarding from the memory the program state and data for the checkpoint as subsequent checkpoints are added to the running window.

25. The method of claim 22, wherein the second subsystem is arranged to operate over a sequence of steps, wherein between the steps of the sequence the second program has a deterministic memory state; and wherein the point in time at which the checkpoint is placed is between the two steps of said sequence.

26. The method of claim 22, wherein the second subsystem is arranged to operate over a sequence of BSP supersteps of a bulk synchronous parallel, BSP, synchronization scheme; and wherein the point in time at which the checkpoint is placed is between the BSP supersteps.

27. A first program comprising code embodied on non-transitory computer-readable storage and configured so as when run on a first subsystem comprising one or more first processors to perform operations of:

sending data from the first subsystem to a second program run on a second subsystem comprising one or more second processors, the second program being configured to operate on the data sent from the first subsystem;

setting a checkpoint at a point in time, including recording in a memory of the first subsystem i) a program state of the second program, comprising at least a state of one or more registers on each of the one or more second processors at the point in time of the checkpoint, and ii) a copy of the data sent to the second subsystem in a time since the checkpoint; and upon detection of a replay event, re-sending from the first subsystem to the second subsystem the data recorded since the checkpoint, and controlling the second subsystem to replay at least part of the second program on at least one of the one or more second processors from the checkpoint, starting with the recorded program state and operating on the re-sent data.

28. The first program of claim 27, wherein the checkpoint is a most recent checkpoint at detection of the replay event.

29. The first program of claim 27, wherein the checkpoint is included within a running window of other checkpoints; the operations further comprising: discarding from the memory the program state and data for the checkpoint as subsequent checkpoints are added to the running window.

30. The first program of claim 27, wherein the second subsystem is arranged to operate over a sequence of steps, wherein between the steps of the sequence the second program has a deterministic memory state; and wherein the point in time at which the checkpoint is placed is between the two steps of said sequence.

31. The first program of claim 27, wherein the second subsystem is arranged to operate over a sequence of BSP supersteps of a bulk synchronous parallel, BSP, synchronization scheme; and wherein the point in time at which the checkpoint is placed is between the BSP supersteps.

* * * * *